United States Patent [19]
Jonkka et al.

[11] Patent Number: 5,660,076
[45] Date of Patent: Aug. 26, 1997

[54] DRIVE SYSTEM OF A ROTATING DRUM

[75] Inventors: Arvo Jonkka, Pori; Antti Tohkala, Rauma; Pauli Vienola, Pori, all of Finland

[73] Assignee: Sunds Defibrator Woodhandling Oy, Pori, Finland

[21] Appl. No.: 559,691

[22] Filed: Nov. 15, 1995

[51] Int. Cl.$^6$ ............................................. F16H 35/06
[52] U.S. Cl. ............................................. 74/399; 74/410
[58] Field of Search ................................. 74/399, 410

[56] References Cited

U.S. PATENT DOCUMENTS

| | | | |
|---|---|---|---|
| 2,674,898 | 4/1954 | Mudersbach | 74/399 |
| 3,299,729 | 1/1967 | Durand | 74/410 X |
| 3,706,237 | 12/1972 | Pere | 74/410 |
| 3,927,575 | 12/1975 | Durand | 74/410 |

Primary Examiner—Richard M. Lorence
Attorney, Agent, or Firm—Burns, Doane, Swecker & Mathis, L.L.P.

[57] ABSTRACT

A drive system of a rotating drum (1), where the drum is supported with a flexible support system. The drive system consists of a gear rim (2) and a pinion gear (4) in contact with the gear rim. The driving pinion gear is supported on a moving platform (10). The drum (1) is provided with a guiding rim (5) and a guiding wheel (6) rolling against it and supported on the same platform as the driving pinion gear. The sum of the outer diameters ($D_2$ and $D_1$) of the guiding rim (5) and the guiding wheel (6) is equal to the sum of the pitch diameters of the gear rim (2) and the driving pinion gear (4). The guiding wheel (6) can be pressed against the guiding rim (5) to maintain the right clearing between the teeth of the pinion gear (4) and the gear rim (2) when the center of the drum (1) is moving.

20 Claims, 6 Drawing Sheets

DRIVE SYSTEM OF A ROTATING DRUM

FIELD OF THE INVENTION

This invention relates to a drive system of a rotating drum, where the drum is supported with a flexible support system or tires, for example rubber tires.

BACKGROUND OF THE INVENTION

The invention relates to equipment which makes it possible to rotate a drum whose centre is moving. These drums are usually supported by means of rubber tires or on flexible supports, and they are very often used for example in barking wood for pulping purpose.

Presently these drums are rotated by means of friction, by driving the rubber tires, or by means of a chain drive. In this way, the rotating part of the drum, resting on flexible supports, can make a swinging movement caused by the drive and the flexibility of the support system. Rotating the drum by means of rubber tires requires many drive tires, gearboxes and electric motors. For that reason the system operating by means of friction is very complicated and expensive. Besides, considerable load is applied on the wheels transferring the driving power, and this reduces the lifetime of the wheels.

SUMMARY OF THE INVENTION

The advantages of a pinion gear and gear rim drive system to a chain drive are: compact-design saves space, less maintenance and fully enclosed guards.

It is characteristic of the drive system according to the invention that the drive system includes a gear drive comprising a gear rim surrounding the drum and a driving pinion gear in contact with the gear rim;

that the driving pinion gear is supported on a moving support bed;

that the drum is provided with a guiding rim surrounding it and a guiding wheel rotating against the guiding rim and supported on the same moving support bed with the driving pinion gear;

that the sum of the outer diameters of the guiding rim and the guiding wheel is equal to the sum of the pitch diameters of the gear rim and the driving pinion gear; and that the guiding wheel can be pressed against the guiding rim in order to maintain the rotation contact between the guiding wheel and the guiding rim and to maintain the right clearance between the teeth of the gear rim and the pinion gear when the centre of the drum is moving.

A system according to the invention makes it possible to take advantage of the pinion gear drive on a rotating drum whose center is moving. The equipment according to the invention is based on the fact that the gear rim and the driving pinion gear are equipped with a guiding rim and a guiding wheel that will be pressed against each other with a sufficient force so that their rotation contact is maintained. The guiding rim and the guiding wheel can also have diameters that differ from the pitch diameters of the gear rim and pinion gear. In this case the guiding wheel must be provided with a bearing that allows a change in the rotation speed relative to the pinion gear next to it.

BRIEF DESCRIPTION OF THE DRAWING FIGURES

The invention and its details are described in detail in the following, with reference to the enclosed drawings where FIG. 1 shows a cross-section of a rubber tire drum, FIG. 2 shows a drive system according to the invention and part of the drum, seen from one side of the drum, FIG. 3 shows the drive system, seen from one end of the drum, FIG. 4 shows in a larger scale the axial section of the guiding wheel bearing system, FIG. 5 shows a drive functioning by means of gravity as seen from one end of the drum, and FIG. 6 is an axial section of the guiding wheel bearing system according to another embodiment.

DETAILED DESCRIPTION OF THE INVENTION

Figure 1:
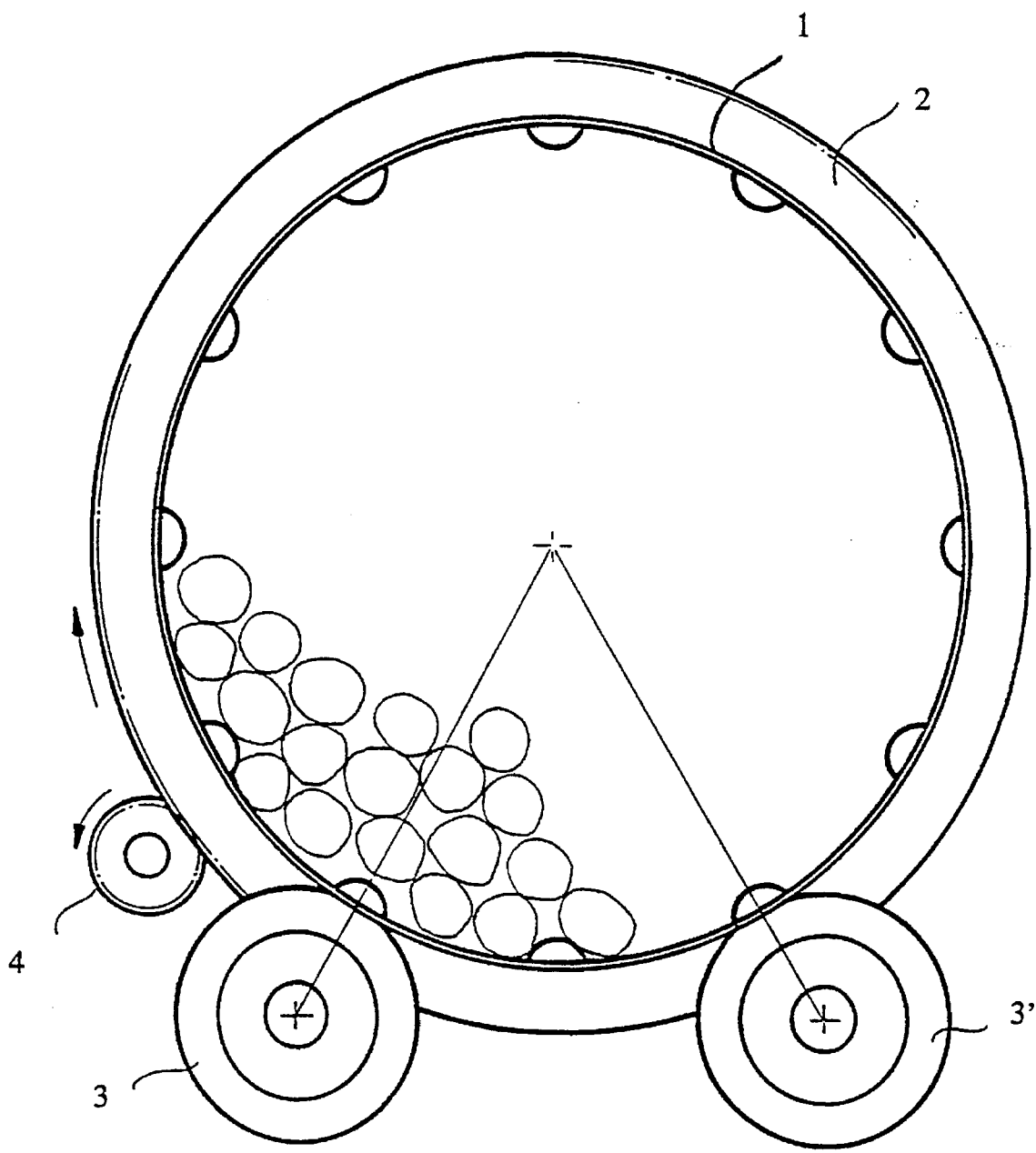

In the rubber tire supported barking drum, shown in FIG. 1, the drum shell 1 is provided with a surrounding gear rim 2 and with supporting rubber tires 3 and 3'. The drum shell is rotated by a pinion gear 4 functioning in co-operation with the gear rim 2.

Figure 2:
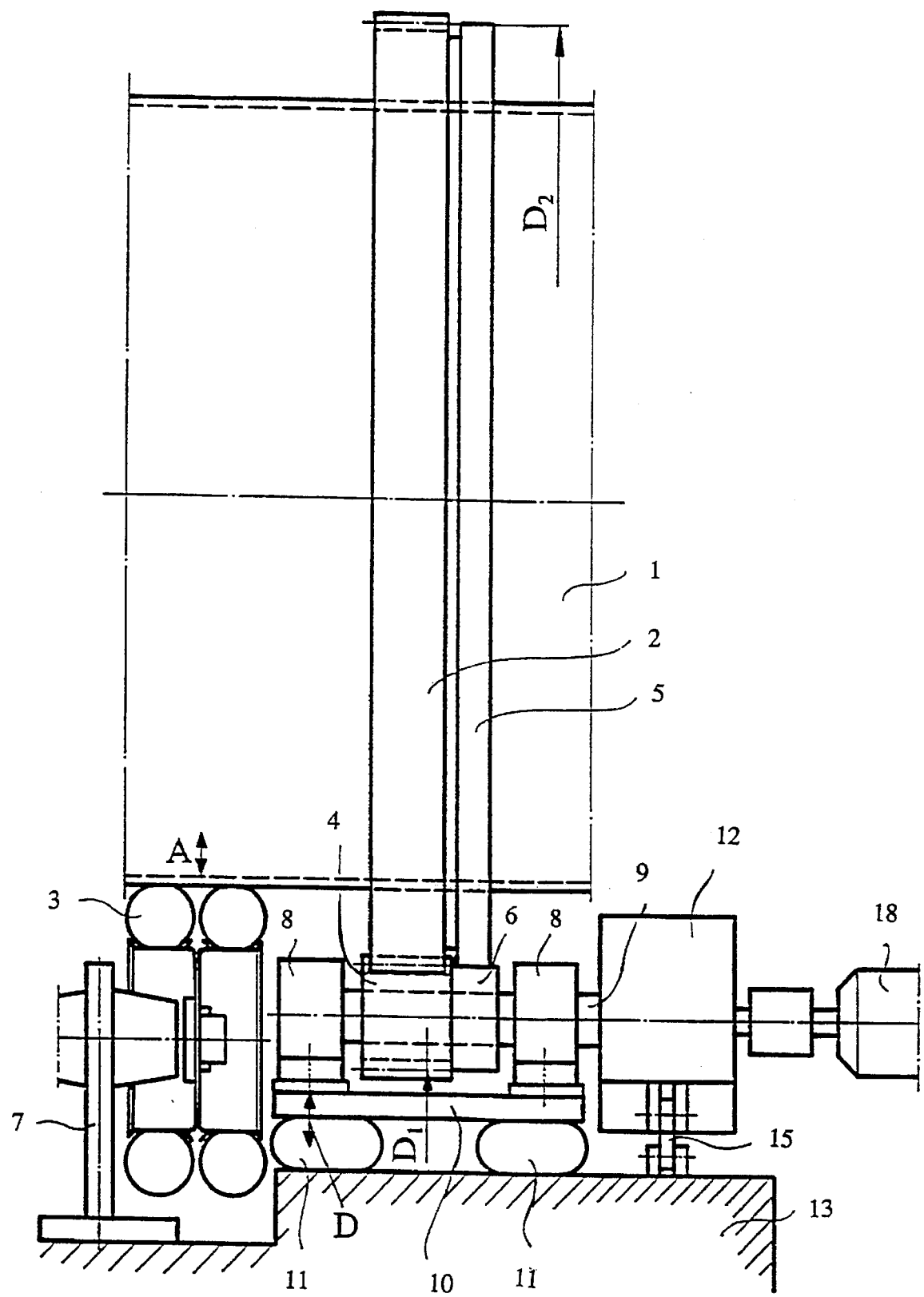

FIG. 2 shows the drive system according to the invention. The gear rim 2 and next to it a big guiding wheel, in other words a guiding rim 5, whose outer diameter $D_2$ is exactly the same as the pitch diameter of the gear rim 2, have been installed on the rotating drum shell 1.

A drive shaft 9 is provided with two bearings 8 and a pinion gear 4 between them and with a guiding wheel 6 on the same shaft. The drive shaft is installed on a moving bed plate 10 and driven by an electric motor in co-operation with a driving gearbox 12. The outer diameter $D_1$ of the guiding wheel 6 is the same as the pitch diameter of the driving pinion gear 4. Elastic elements 11 in collaboration with the bed plate 10, the bearings 8 and the shaft 9 press the guiding wheel 6 against the big guiding rim 5.

The rubber tires 3 whose number depends on the size of the drum, are supported with brackets 7 on a substructure 13. FIG. 2 shows that elasticity corresponding to the elasticity of the rubber tires 3, or other flexible support system, pointed with an arrow A has to be accrued in the elastic elements 11 equivalent with the gear ratio of the structures, as a movement indicated with an arrow D.

Figure 3:
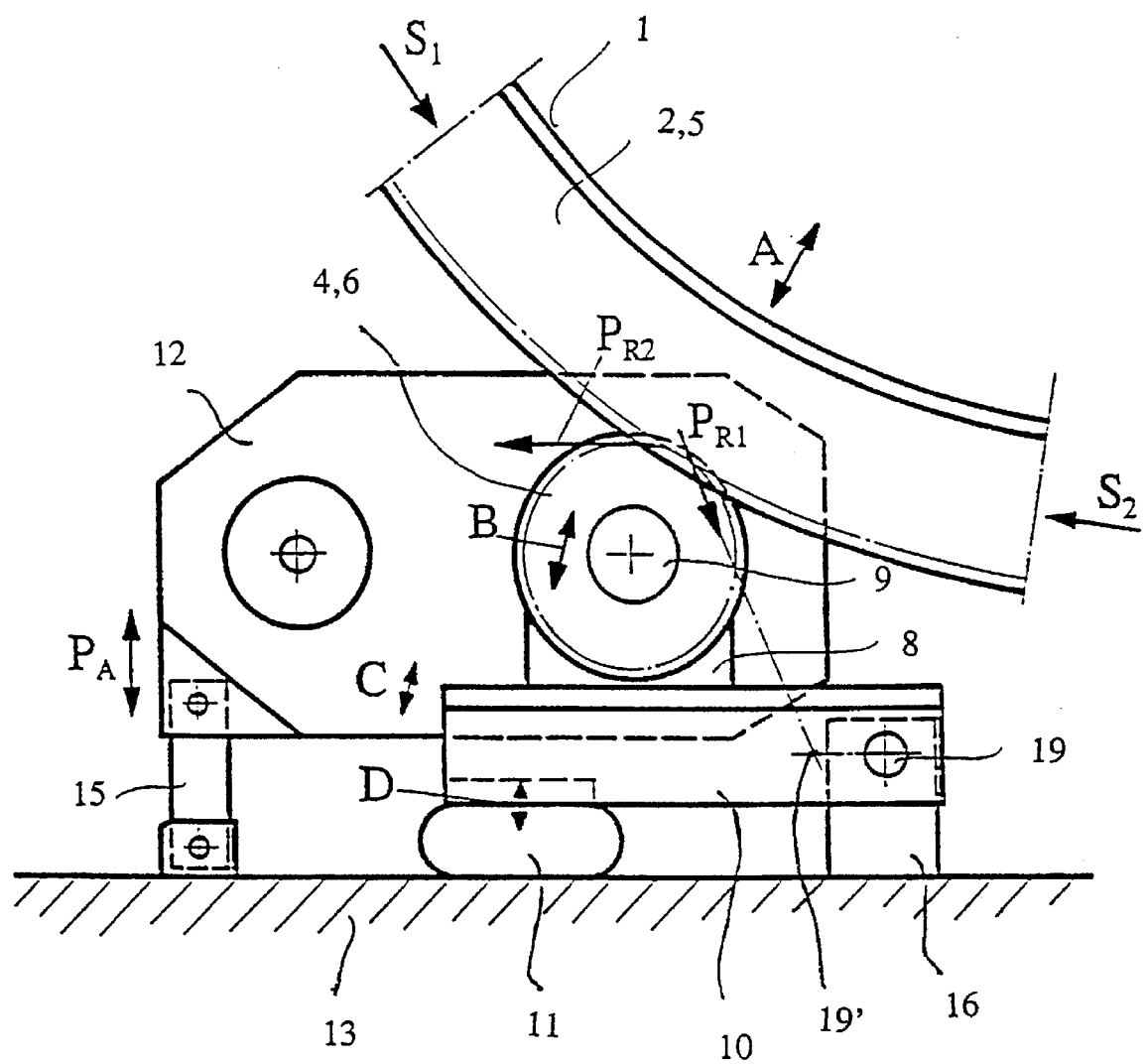

FIG. 3 shows that the elastic element 11 rests against the structure 13 and presses upwards the moving bed plate 10 attached with an elbow joint 19 to a pivot base 16. The moving bed plate 10 in co-operation with the bearings 8 presses the shaft 9 and the guiding wheel 6 installed on it, against the guiding rim 5 installed on the shell of the drum. The gear contact in driving is maintained because the sum of the diameters of the guiding rim 5 and the guiding wheel 6 is equal to the sum of the pitch diameters of the corresponding gears 2 and 4. When the drum is moving as in FIG. 3 in the direction A, the moving bed plate 10 makes a movement in the direction pointed with an arrow C, and the elastic element 11 makes a movement according to an arrow D.

The gearbox 12 and an electric motor 18 driving it can be supported on the moving bed plate 10 by using the shaft 9 as the support. The gearbox 12 is also supported on the substructure 13 by an anchorage support 15, whose top is pivotally attached to the gearbox.

The advantage of the system according to FIG. 3 is that when the drum 1 is rotating in the direction $S_1$ (the driving gear 12 is situated on the side where the drum is descending), a pressing force $P_A$ reducing the load on the elastic element 11 and increasing the rotation pressure of the guiding rim 5 and the guiding wheel 6, is developed in the anchorage support 15 between the gearbox 12 and the substructure 13. The rotation pressure is reduced by the meshing force $P_{R2}$ between the gears 2 and 4 in relation to the power that is transferred. Because the anchoring force $P_A$ increases along the power, it is possible to build a machine where the contact pressure of the guiding rim 5 and guiding wheel 6 is nearly constant.

When the drum 1 is rotating in the direction $S_2$ (the gearbox 12 is on the ascending side of the drum), the force $P_A$ affects upwards and a tensile stress is developed in the anchorage support 15, bringing additional load on the elastic element 11 when the torsion moment is increasing. From FIG. 3, one can see that the distance between the mesh power $P_{R1}$ and the elbow joint 19 is small, and therefore the decreasing effect on the rotating pressure of the guiding wheels 5 and 6 is very low.

By building a system similar to the one in FIG. 3 so that the gearbox 12 is installed entirely on the moving bed plate 10 and by moving the elbow joint 19 to the point 19', in other words on the line of application of the meshing force $P_{R1}$, a structure is achieved where this change in the driving power does not significantly affect the rotation pressure of the guiding wheels.

Figure 4:
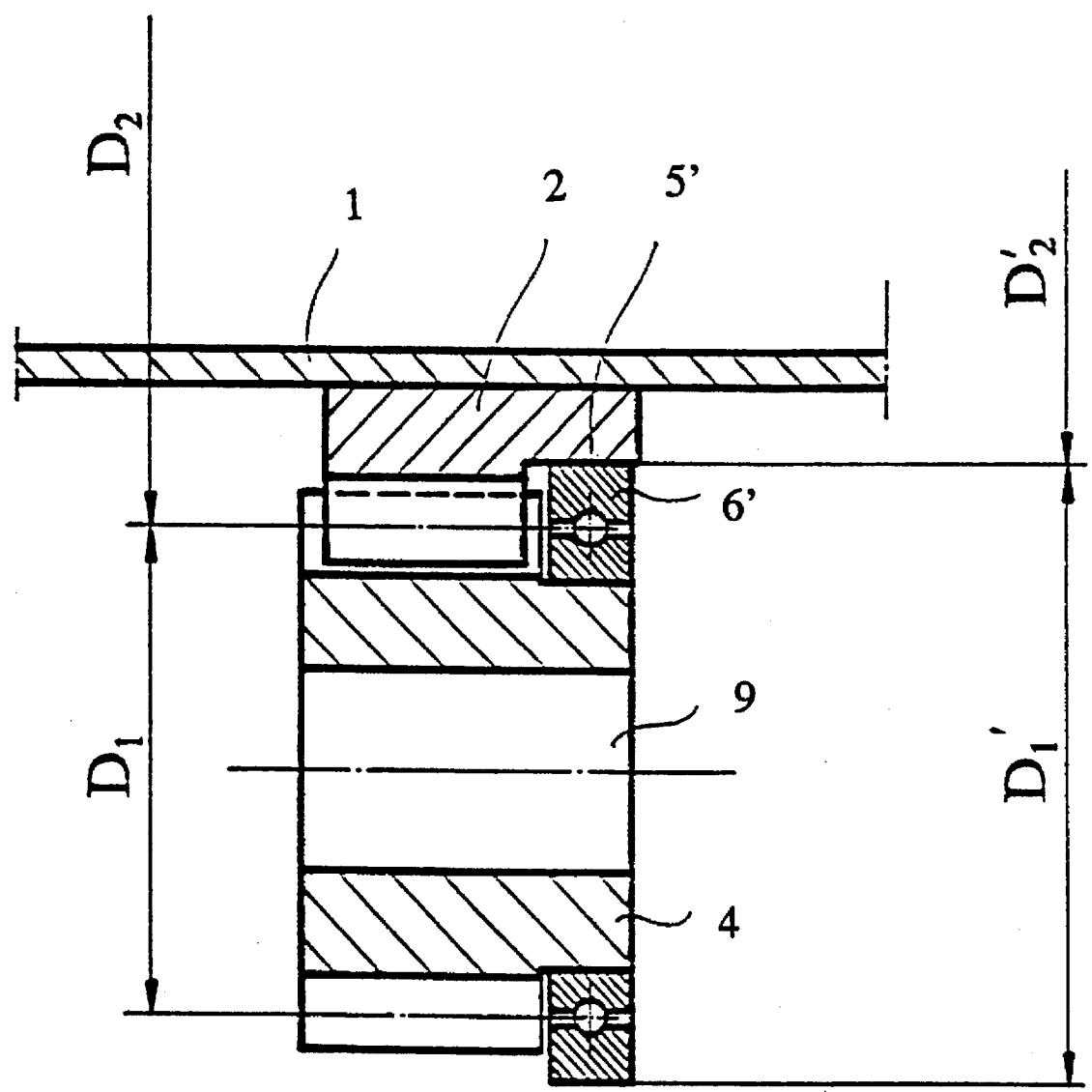

FIG. 4 shows an alternative guiding system. In this case the rotating surface 5' of the guiding rim has been built on the large gear rim 2 as shown in FIG. 4, and a bearing rim 6' forms the little guiding wheel with the inner bearing face attached to the pinion gear 4.

Figure 5:
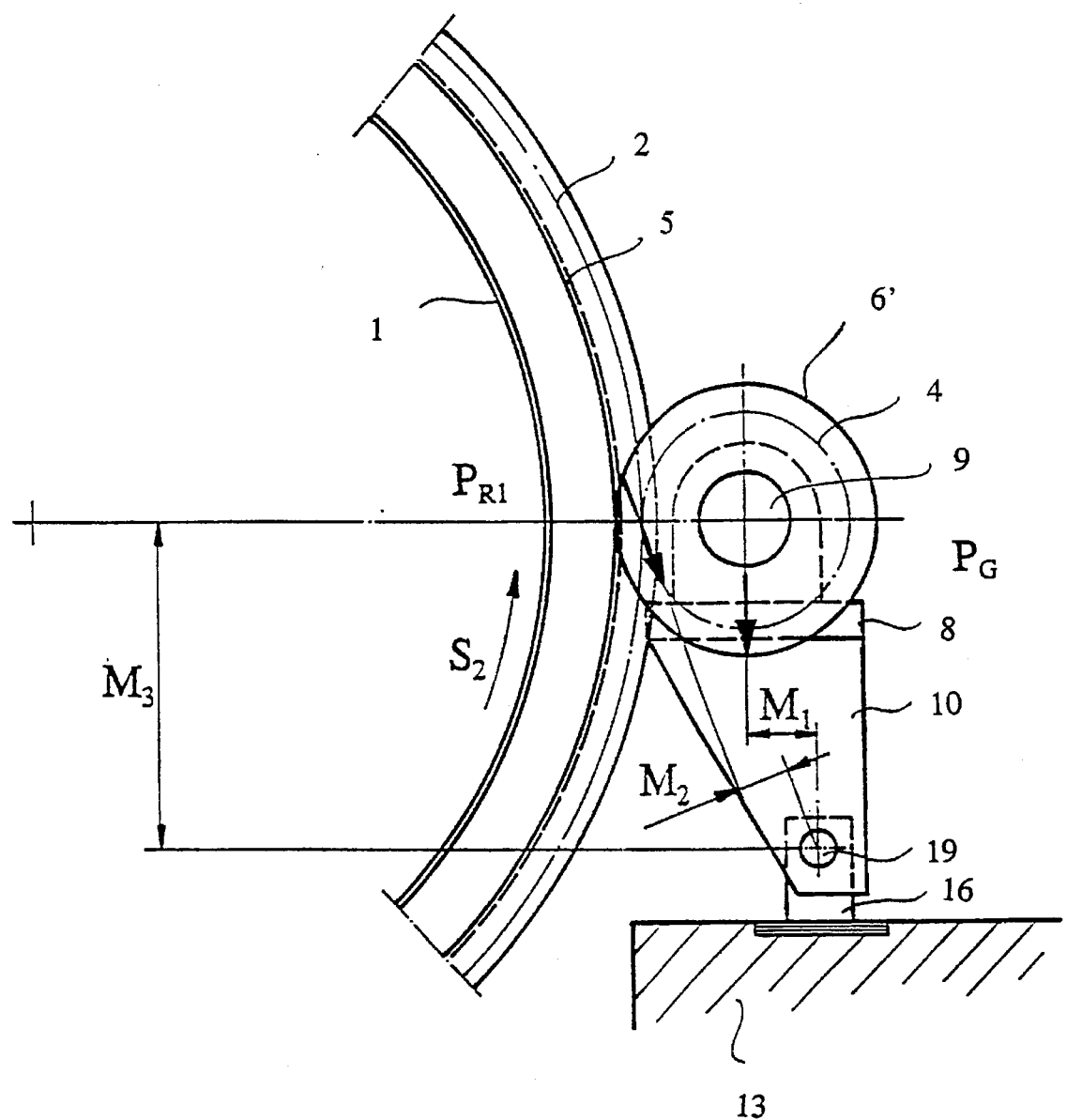

By locating the driving pinion gear as in FIG. 5 very high up on the ascending side of the drum 1, it is possible to make the drive system in a simple way, without an elastic element. In that case a sufficient preloading pressure of the rotation wheels is formed by the total weight $P_G$ of the parts on the moving bed plate 10, in other words the bearings 8, the pinion gear 4, the guiding wheel 6', the shaft 9 and the moving bed plate 10, and by the moment distance $M_1$. When the driving power increases, the distance $M_2$ between the meshing force and the joint pin 19 makes the rotation pressure of the guiding wheels 5' and 6' increase. The impact of the forces $P_G$ and $P_{R1}$ on the rotation pressure is in ratio $M_1:M_2$ and $M_2:M_3$ where $M_3$ is the vertical distance between the contact point of the rotation surfaces 5' and 6' and the joint pin 19.

In practice, the direction of the meshing force $P_{R1}$ can vary because of the inaccuracy of the fabrication. Due to that, the moment distance $M_2$ increasing the rotation pressure must be chosen so that it is always higher than zero, so that a good gear drive is secured.

Figure 6:
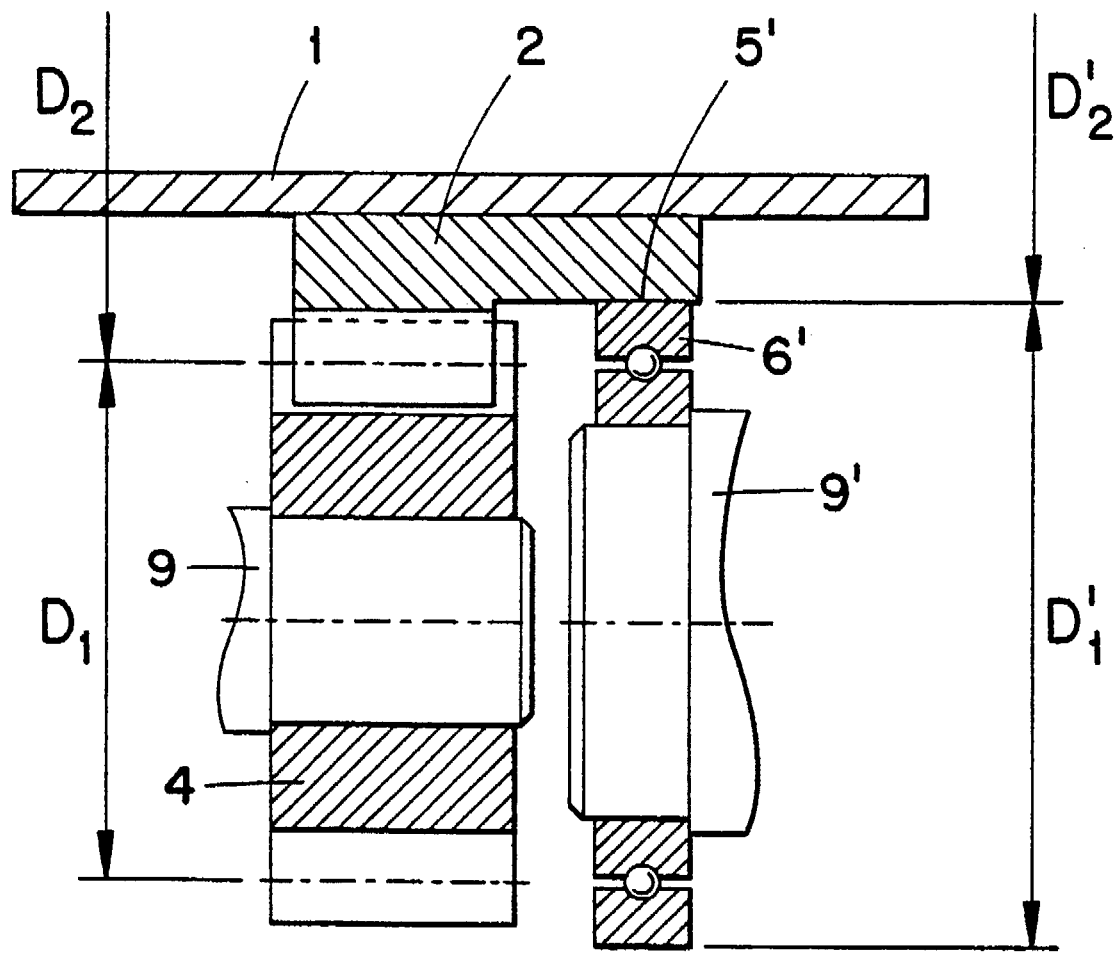

It is also possible to mount the pinion gear 4 and the guide wheel 5 on separate shafts (see FIG. 6) on the same moving bed plate 10, and the shafts need not necessarily be concentric.

The particular design of the system according to the invention depends on the primary requirements of the system. Then the loading capacity of the rotating surfaces, the force of the elastic elements, the anchoring force, the gear size, the direction of the meshing force and the changes in the movable moment have to be taken into account.

We claim:

1. A drive system of a rotating drum where the drum is supported with a flexible support system resulting in the drum having a moving center, comprising:

a gear drive that includes a gear rim surrounding the drum and a driving pinion gear in contact with the gear rim to drive the gear rim, the gear rim and the driving pinion gear each having a pitch diameter;

the driving pinion gear being supported on a moving support bed;

the drum having a drum axis and being provided with a guiding rim that surrounds the drum, a guiding wheel rotating against the guiding rim and supported on the same moving support bed as the driving pinion gear, the guiding rim and the guiding wheel each having an outer diameter;

the sum of the outer diameters of the guiding rim and the guiding wheel being equal to the sum of the pitch diameters of the gear rim and the driving pinion gear; and the guiding wheel being pressable against the guiding rim to maintain rotation contact between the guiding wheel and the guiding rim and to maintain clearance between the teeth of the gear rim and the pinion gear when the center of the drum moves.

2. A drive system according to claim 1, wherein the guiding wheel is concentric with the pinion gear.

3. A drive system according to claim 1, wherein the outer diameter of the guiding rim is equal to the pitch diameter of the gear rim, and the outer diameter of the guiding wheel is equal to the pitch diameter of the pinion gear, and the guiding wheel being attached to the driving pinion gear.

4. A drive system according to claim 1, wherein the outer diameter of the guiding rim differs from the pitch diameter of the gear rim, and the outer diameter of the guiding wheel differs from the pitch diameter of the driving pinion gear, the guiding wheel being independently rotatable with respect to the driving pinion gear to permit a rotation speed of the guiding wheel to differ from a rotation speed of the driving pinion gear.

5. A drive system according to claim 1, wherein the moving support bed is supported on a substructure for pivoting movement around a pivot axis parallel to the drum axis.

6. A drive system according to claim 1, wherein the support bed is supported by an elastic element which presses the guiding wheel against the guiding rim.

7. A drive system according to claim 5, including a driving mechanism for providing driving power to the gear drive, the driving mechanism being supported on the moving support bed that supports the driving pinion gear and located on a descending side of the drum, the support bed being supported by elastic elements, the driving mechanism being supported on the substructure with an anchoring support which is pivotally connected between the driving mechanism and the substructure so that compression stress accrued in the anchoring support lifts the driving mechanism upwards and increases surface pressure between the guiding wheel and the guiding rim, when a meshing force between the gear rim and the pinion gear is decreasing, so that a load independent from a driving power of the driving mechanism is achieved on the elastic elements.

8. A drive system according to claim 5, wherein the driving pinion gear is located on an ascending side of the drum, and the pivot axis of the moving support bed is located on a line of application of a meshing force between the gear rim and the pinon gear so that the meshing force does not change a rotating pressure between the guiding rim and the guiding wheel.

9. A drive system according to claim 5, wherein the guiding wheel is pressed against the guiding rim by gravity.

10. A drive system according to claim 9, including a driving mechanism for delivering driving power to the gear drive, the driving pinion gear being located on an ascending side of the drum, and the pivot axis of the moving support bed being located so that by virtue of the total weight of the support bed and parts that are supported on the support bed and by virtue of the moment distance between the total weight and the pivot axis, a rotation pressure is formed on the guiding wheel and guiding rim, said rotation pressure remaining the same when the pivot axis is on a line of application of the meshing force or increasing with the driving power of the driving mechanism in a ratio of the moment distance between the meshing force and the pivot axis to a vertical distance between a contact point of the guiding wheel and guiding rim and the pivot axis.

11. A drive system according to claim 1, wherein the driving pinion gear and the guide wheel are supported on separate shafts on the same moving support bed.

12. A drive system according to claim 2, wherein the outer diameter of the guiding rim is equal to the pitch diameter of the gear rim, and the outer diameter of the guiding wheel is equal to the pitch diameter of the pinion gear, and the guiding wheel being attached to the driving pinion gear.

13. A drive system according to claim 2, wherein the outer diameter of the guiding rim differs from the pitch diameter of the gear rim, and the outer diameter of the guiding wheel differs from the pitch diameter of the driving pinion gear, the guiding wheel being independently rotatable with respect to the driving pinion gear to permit a rotation speed of the guiding wheel to differ from a rotation speed of the driving pinion gear.

14. A drive system according to claim 3, wherein the outer diameter of the guiding rim differs from the pitch diameter of the gear rim, and the outer diameter of the guiding wheel differs from the pitch diameter of the driving pinion gear, and the guiding wheel is independently rotatable with respect to the driving pinion gear to permit a rotation speed of the guiding wheel to differ from a rotation speed of the driving pinion gear.

15. A drive system according to claim 2, wherein the moving support bed is supported on a substructure for pivoting movement around a pivot axis parallel to the drum axis.

16. A drive system according to claim 3, wherein the moving support bed is supported on a substructure for pivoting movement around a pivot axis parallel to the drum axis.

17. A drive system according to claim 2, wherein the support bed is supported by an elastic element which presses the guiding wheel against the guiding rim.

18. A drive system according to claim 3, wherein the support bed is supported by an elastic element which presses the guiding wheel against the guiding rim.

19. A drive system according to claim 6, including a driving mechanism for providing driving power to the gear drive, the driving mechanism being supported on the moving support bed that supports the driving pinion gear and located on a descending side of the drum, the support bed being supported by elastic elements, the driving mechanism being supported on the substructure with an anchoring support which is pivotally connected between the driving mechanism and the substructure so that compression stress accrued in the anchoring support lifts the driving mechanism upwards and increases surface pressure between the guiding wheel and the guiding rim, when a meshing force between the gear rim and the pinion gear is decreasing, so that a load independent from a driving power of the driving mechanism is achieved on the elastic elements.

20. A drive system according to claim 6, wherein the driving pinion gear is located on an ascending side of the drum, and the pivot axis of the moving support bed is located on a line of application of a meshing force between the gear rim and the pinon gear so that the meshing force does not change a rotating pressure between the guiding rim and the guiding wheel.

* * * * *